May 12, 1936.  J. WOODFORDE  2,040,539

APPARATUS FOR THE REMOTE CONTROL OF RAILWAY POINTS, SIGNALS AND THE LIKE

Filed Oct. 3, 1932  3 Sheets-Sheet 1

INVENTOR
John Woodforde
BY
HIS ATTORNEY

May 12, 1936.  J. WOODFORDE  2,040,539
APPARATUS FOR THE REMOTE CONTROL OF RAILWAY POINTS, SIGNALS AND THE LIKE
Filed Oct. 3, 1932  3 Sheets-Sheet 2

INVENTOR
John Woodforde.
BY
HIS ATTORNEY

Patented May 12, 1936

2,040,539

UNITED STATES PATENT OFFICE 2,040,539

APPARATUS FOR THE REMOTE CONTROL OF RAILWAY POINTS, SIGNALS, AND THE LIKE

John Woodforde, King's Cross, London, England, assignor, by mesne assignments, to The Union Switch & Signal Company, Swissvale, Pa., a corporation of Pennsylvania Application October 3, 1932, Serial No. 635,882 In Great Britain November 9, 1931

8 Claims. (Cl. 246—3)

This invention relates to apparatus for the remote control of railway points and signals or the like and has for its object to provide improved apparatus of this character which shall be particularly suitable for the control of a relatively simple group of points and signals situated at a moderate distance from the point of control. Point and signal installations of this character are in general unsuitable for control by systems of the code current type owing to their relatively high cost although the apparatus of the invention is capable of being replaced by code control apparatus if desired in the event of extension of the installation without involving material alteration of the principal circuits.

According to the principal feature of the invention the point of control and the device such as the points or signal to be controlled are arranged to be connected together by a starting circuit and a combined control and indication circuit, this latter circuit normally serving to give a continuous indication of the setting of the device while being utilized as a control circuit when it is desired to effect any change in this setting. The starting circuit, on the other hand, serves to effect the transfer of the control and indication circuit from its normal indication function to its control function in order to effect the change in setting above referred to.

Figure 1:
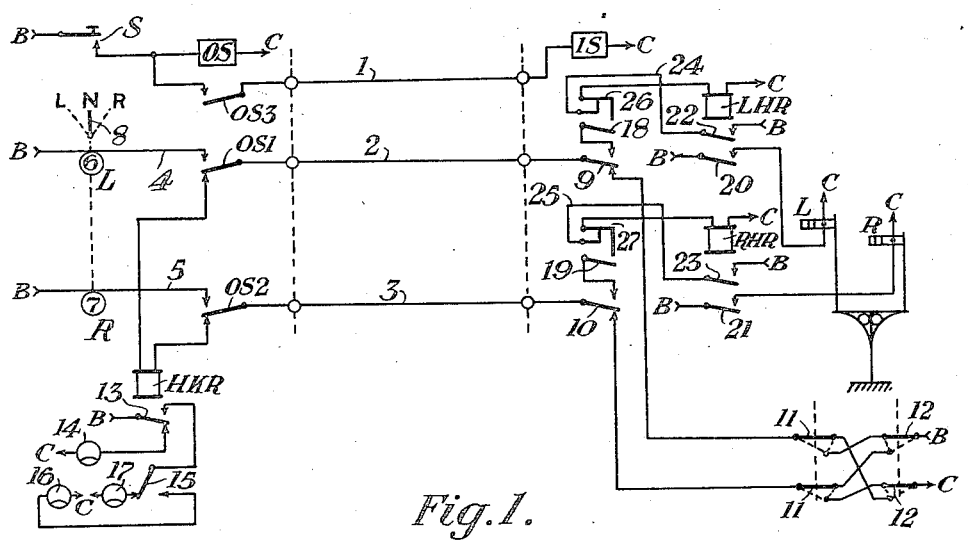
Figure 3:
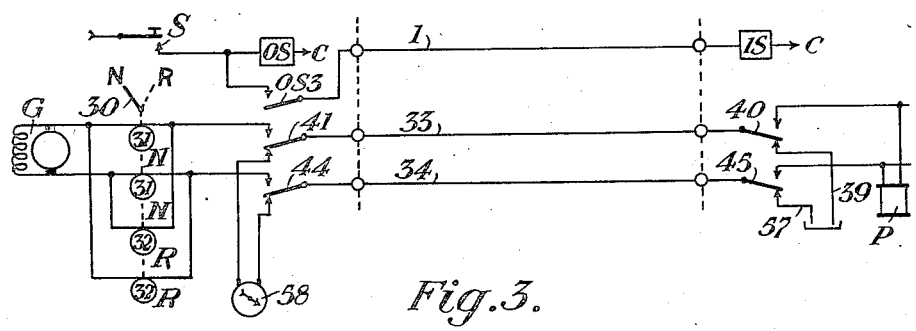
Figure 2:
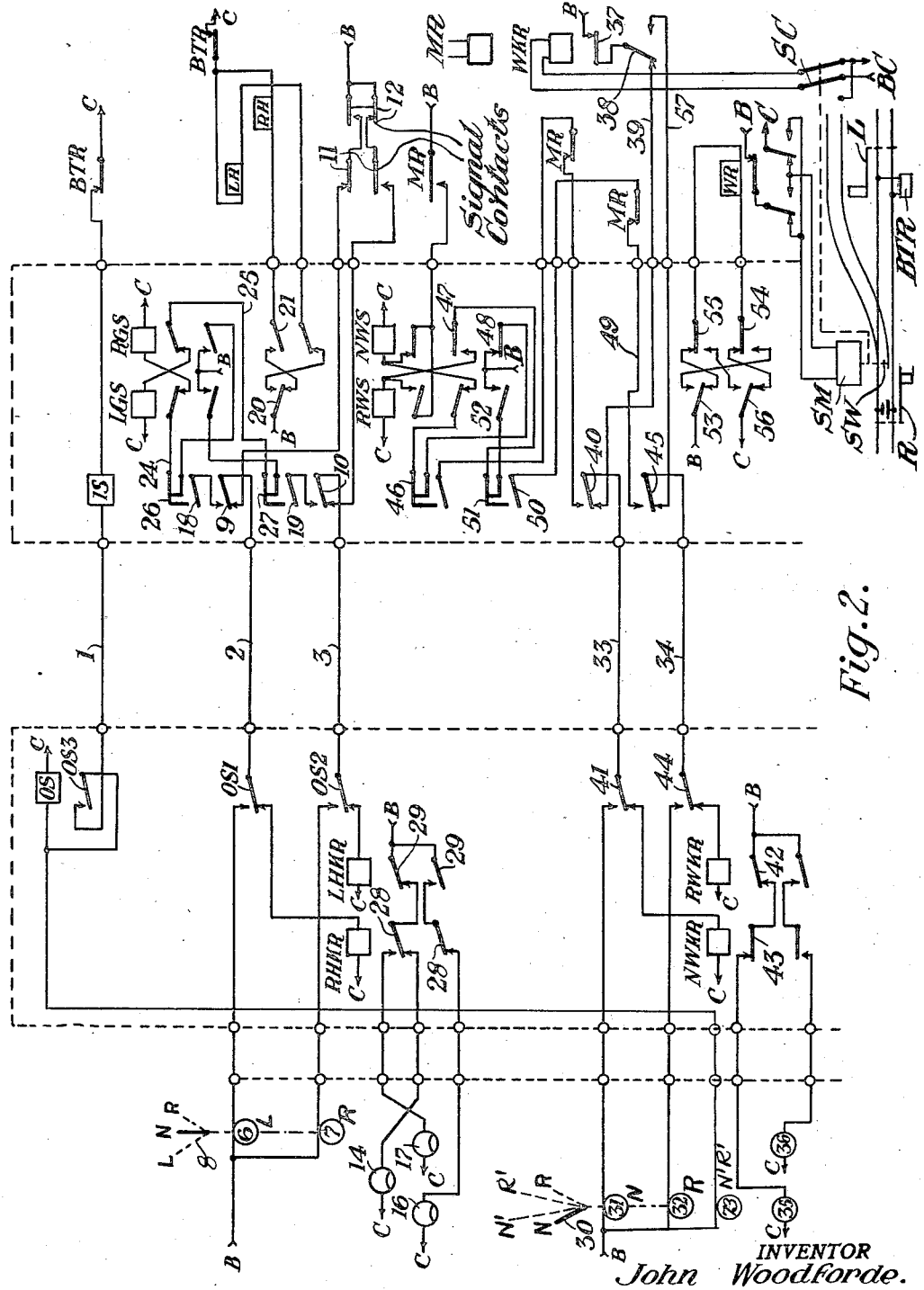
Figure 5:
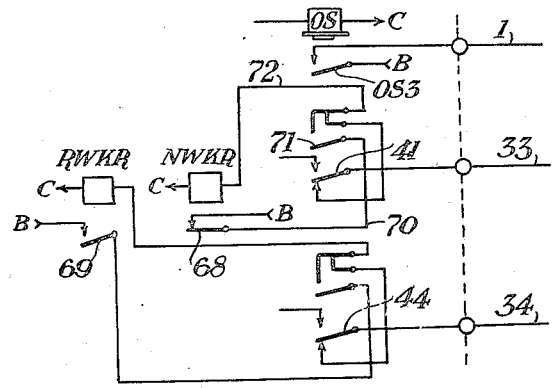
Figure 6:
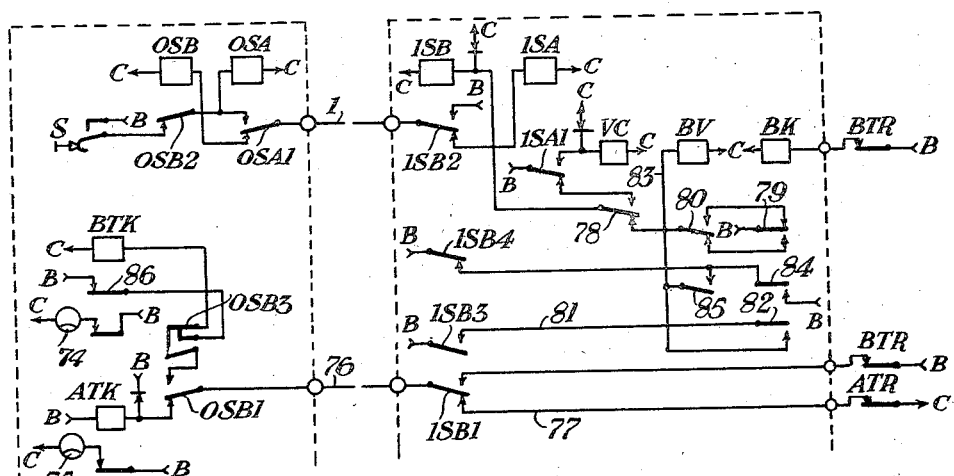

The invention is illustrated by way of example in the accompanying drawings, Fig. 1 of which is a diagrammatic view of a simple system embodying the invention and adapted to control the operation of two signals, Fig. 2 being a similar view of a more elaborate system adapted to control both points and signals. Fig. 3 is a similar view of a simple system adapted to control the operation of points by current derived from a hand-operated generator, Fig. 4 being a simple point control system embodying a time element relay for approach locking. Fig. 5 illustrates a modified form of a portion of the system shown in Fig. 2 and Fig. 6 is a diagrammatic view of a further modification in which auxiliary starting relays are employed.

Referring now first to the system shown in Fig. 1 it will be seen that the two signals to be controlled are indicated at L, R, each of these signals being adapted to be set into its "proceed" position when the corresponding electrically operated signal mechanism is energized and to return automatically to its "danger" position when this mechanism is deenergized. The signals L, R, are connected to the point of control by a starting line 1 and two control and indication lines 2, 3.

At the point of control a starting switch S operated by a press button is provided which when closed serves to effect the energization of a control starting relay 0S which in turn effects the supply of current to the starting line 1. The control relay 0S when in its normal or deenergized condition effects the connection of the lines 2, 3, through relay contacts 0S1, 0S2 to the terminals of a polarized indication relay HKR, while when the control relay 0S is energized, the lines 2, 3, are connected through the relay contacts 0S1, 0S2 to conductors 4, 5, leading to one terminal B of a source of current through contacts 6L, 7R, operated or controlled by a signal selector lever 8. This lever is adapted to occupy one or another of three positions indicated at L, N, and R and the contacts 6L, 7R, are closed only when the lever 8 is in its L or R position respectively corresponding to the signal to be operated, both contacts 6L, 7R, being open when the lever is in its N position.

At the remote point where the signals L, R, are located the starting line 1 is connected to a field starting relay IS which is thus energized by the current supplied through the starting line 1 when the switch S at the point of control is operated. The relay IS is provided with contacts 9, 10 which when the relay IS is deenergized serve to connect the lines 2, 3, to the terminals B, C of a local source of current through signal contacts 11, 12, operated by the signals L, R in such a manner that so long as both signals are at "danger" the lines 2, 3, are both disconnected from the source at the signal contacts 11, 12. When, however, the L signal is at "proceed" the signal contacts 11, 12, connect the positive terminal B and the negative terminal C of the source to the lines 2, 3, respectively through the contacts 9, 10, of the deenergized field starting relay IS while when the R signal is at proceed, these connections are reversed at the signal contacts 11, 12.

It will thus be evident that so long as the signals L, R, both indicate "danger" current is not supplied to the lines 2, 3, and the indication relay HKR at the point of control is deenergized. Under these conditions a neutral contact 13 on the relay HKR is arranged to complete a circuit through a red indication lamp 14. If, however, the L signal or the R signal is giving a "proceed" indication, current in the positive or negative direction is supplied to the indication relay HKR which is thus energized in one or the other direction to operate a polarized contact 15 effecting the supply of current to a corresponding green indication lamp 16 or 17 thus indicating that a change in the indication of the corresponding signal has been effected. It will be observed that this arrangement ensures a continuous indication at the point of control of the settings of both the L and R signals and notifies to the signalman any change in this setting.

The field starting relay IS is also provided with transfer contacts 18, 19 which when the relay is energized, serve to connect the lines 2, 3, respectively which have been disconnected from the signal contacts 11, 12 at the relay contacts 9, 10 to the energizing circuits of signal relays LHR and RHR corresponding to the L and R signals. Each of the signal relays LHR and RHR when thus energized closes a relay contact 20, 21 through which operating current is supplied to the setting mechanism of the corresponding signal L or R. Each signal relay LHR or RHR when energized also closes a contact 22 or 23 included in a stick circuit 24, 25, for the signal setting mechanism, the stick circuits 24, 25, including contacts 26, 27, which are closed when the field starting relay IS is deenergized as shown so that when once energized the signal relay LHR or RHR remains energized until the field starting relay IS is again energized from the point of control.

The operation of the system is as follows:

So long as both the signals L, R are giving a normal or "danger" indication, the signal indication relay HKR at the point of control is deenergized as above explained so that the red indication lamp 14 is illuminated.

When it is desired to set the L signal to "proceed", the signalman will set the signal lever 8 from its normal or N position to its L position and will then operate the press-button switch S. The control starting relay OS is thus energized and the field starting relay IS is in turn energized through relay contact OS3 and the starting line 1. The energization of the relay IS interrupts the connections of the lines 2, 3, to the signal contacts 11, 12 at the relay back contacts 9, 10 while these lines are connected to the energizing circuits of the signal relays LHR, RHR through relay front contacts 9, 10 and the transfer contacts 18, 19. Owing to the setting of the signal lever 8, current is supplied through the corresponding lever contact 6L to the line 2 and energizes the signal relay LHR which thereupon effects the supply of current to the operating mechanism of the signal L through the relay contact 20. The signal L is thus set to its "proceed" indication and as soon as the starting switch S is released, the consequent deenergization of the field starting relay IS completes the stick circuit 24 of the signal relay LHR so that the latter remains energized. The deenergization of the field starting relay IS also reconnects the lines 2, 3, to the signal contacts 11, 12, so that these lines are now supplied with indication current in the positive direction as above explained and the setting of the signal L is indicated by the illumination of the green lamp 16 at the point of control.

In order to restore the signal L to its "danger" indication, the signal lever 8 is restored to its N position and the starting switch S is again operated. The field starting relay IS is thus reenergized and interrupts the stick circuit 24 of the signal relay LHR. The latter is thus deenergized and the supply of operating current to the setting mechanism of the signal L being interrupted at the relay contact 20, the signal L returns to its "danger" indication this change in setting being indicated at the point of control as above explained.

The setting of the other signal R to its "proceed" indication is effected in a similar manner by setting the signal lever 8 to its R position and then operating the starting switch S.

Referring now to the system shown in Fig. 2, the portion of this system relating to the control of the signals is substantially the same as that of Fig. 1 except that instead of a polarized indication relay at the point of control two neutral indication relays RHKR and LHKR are provided connected respectively to the lines 2, 3, through the contacts OS1 and OS2 of the relay OS when this relay is deenergized. The relays RHKR and LHKR control through their contacts 28, 29, the circuits of the indication lamps 14, 16, 17 in the same manner as that already described. Fig. 2 differs from Fig. 1 in the further respect that the starting relay OS is controlled by the point lever 30 rather than being controlled by the starting switch or push button S as in Fig. 1.

The signal control relays are indicated in Fig. 2 at LGS and RGS the energizing circuits of these relays being interlocked with each other as shown and the relays controlling the supply of operating current to the signal setting mechanisms LH, RH for the signals L and R, respectively.

The circuit of the starting line 1 including the starting relay IS is shown as controlled by the contacts of a track relay BTR which also controls the current supply circuit of the mechanisms LH and RH so that the starting relay IS and the setting mechanisms LH and RH can not be energized unless the portion of the track corresponding to the relay BTR is unoccupied by a train or vehicle.

Referring now to the portion of the system of Fig. 2 controlling the setting of track points of the switch SW at the remote point adjacent for instance to the signals L and R it will be seen that a point lever 30 is provided at the point of control, the lever 30 being adapted to be operated to one or the other of two positions indicated at N, R, respectively and having two intermediate positions $N^1$, $R^1$, between which a lever contact $73N^1R^1$ remains closed. Contact $73N^1R^1$ is operated by the lever 30 in such a manner that this contact becomes temporarily closed during the initial stage of the movement of the lever 30 from its N to its R position, and vice versa. It will thus be evident that the movement of the lever 30 from either of its operative positions N or R will effect the energization of the starting relay OS without further action on the part of the signalman.

The lever 30 is adapted to operate or to control contacts 31N, 32R, through which current is supplied to point control and indication lines 33, 34 leading from the point of control to the remote point. Point indication relays NWKR and RWKR and indication lamps 35, 36 are provided at the point of control and point control relays RWS and NWS at the remote point, these relays controlling the supply of operating current to a polarized switch control relay WR which operates the point setting mechanism or switch machine SM. A polarized point indication relay WKR is also provided and the operation of this portion of the system is as follows:

Assuming that the points occupy their normal position so that the switch circuit controller SC is in the position illustrated and the point indication relay is energized in its positive direction, an indication circuit is completed from the terminal B at the remote point through neutral contact 37 and polarized contact 38 of relay WKR, wire 39, back contact 40 of the deenergized relay IS, line 33, back contact 41 of the deenergized relay OS and winding of relay NWKR to terminal C.

A circuit is thus completed at the point of control through indication lamp 35 by way of relay contacts 43, 42 of relays NWKR and RWKR so that lamp 35 is illuminated giving a continuous indication that the points are set in their normal position.

When it is desired to reverse the points, the lever 30 is moved toward its R position thus closing contact 73N¹R¹ so that the relays OS and IS become energized.

The energization of relay IS interrupts the stick circuit of relay NWS at relay contact 46 and relay NWS is accordingly deenergized closing contact 47 and opening contact 48.

A circuit is then completed from terminal B at the point of control through lever contact 32R front contact 44 of relay OS, line 34, front contact 45 of relay IS, wire 49, contacts 50 and 51 of relay IS, contact 47, and winding of relay RWS to terminal C.

Relay RWS being thus energized, a stick circuit for this relay is completed when the relay IS is again deenergized through relay contacts 52, 51 and 47. The energization of relay RWS completes a circuit through the switch control relay WR by way of relay contacts 53, 54, 55 and 56 so that the switch machine SM is supplied with operating current to effect the reversal of the points.

The initial movement of the points operates the controller SC and deenergizes the point indication relay WKR so that the relay NWKR is also deenergized and the lamp 35 is extinguished. As soon as the points are fully set into their reverse position, the relay WKR is supplied with negative current and a circuit is completed through the polarized contact 38, wire 57, back contact 45, line 34, back contact 44 to indication relay RWKR which is accordingly energized and causes the indicator lamp 36 to be illuminated to indicate that the points occupy their reverse position.

The reverse operation of returning the points to their normal position is effected in a similar manner by moving the lever 30 toward its N position.

It will be observed that a continuous indication of the position of the points and signals is given at the point of control and any displacement of the points or signals from the position to which they have been set is indicated by the extinction of the corresponding indication lamp.

In the system of Fig. 2 certain additional controls by relay contacts are indicated at MR for the purpose of providing control of the operation of the points in accordance with track occupation or other local conditions. For example, relay MR may be the usual approach locking and signal locking relay, so that it will not be energized unless the track section approaching the switch is unoccupied and the governing signal is set at "danger". When this signal indicates "proceed", relay MR is deenergized and the stick circuit over the back contact of relay MR is effective to prevent a release of the active point relay NWS or RWS. Therefore, a reversal of the switch points will not be possible under this condition, even though lever 30 is reversed and switch S is operated. Similarly, when the approach section is occupied, the pickup circuits for both point relays are open at the front contacts of relay MR so that a reversal of the points is again impossible. The stick circuit over the back contact of relay MR performs the added function of insuring that should the points become accidentally displaced from the fully closed position, they will be returned automatically to this position by virtue of the energized condition of the respective point relay.

Referring now to Fig. 3, a simple form of system is illustrated for the control of track points in which the current for controlling the point setting mechanism is derived from a hand operated generator G. The point lever 30 is in this case provided with two sets of contacts 31N, 32R so arranged that the connections of the terminals of the generator G to the lines 33, 34 are reversed when the lever 30 is moved from its N position to its R position and vice-versa.

The operation of the system is similar to that of the systems already described, and it will be understood that a continuous indication of the position of the points is given by an indicator 58 at the point of control by current supplied through the wires 39, 57, back contacts 40, 45 of relay IS, lines 33 and 34 and back contacts 41, 44 of relay OS.

When it is required to move the points to their reverse position the lever 30 is set into its R position, the starting switch S is closed and the generator G operated. Control current from the generator is thus supplied to the lines 33, 34 through the front contacts 41, 44 and 40, 45 of the energized relays OS and IS, the current thus supplied energizing in the positive direction a polarized point control relay P which controls the supply of operating current to the point setting mechanism.

If desired the switch S may be replaced by contacts adapted to be automatically closed by a centrifugal device or otherwise when the generator G is operated.

Figure 4:
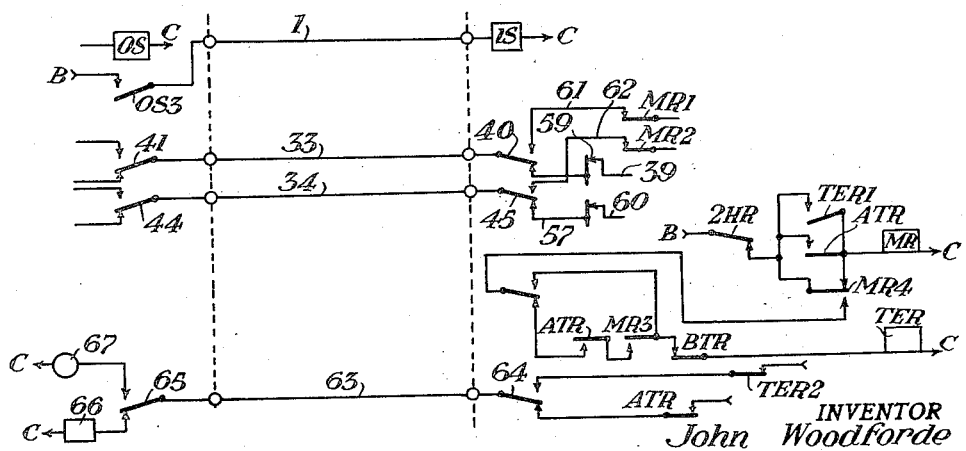

Referring now to Fig. 4, illustrating arrangements for effecting approach locking of the track points which may be embodied in any of the systems previously described, it will be seen that a time-controlled relay TER is provided at the remote point. The relay TER is adapted to be energized when a train or vehicle occupies an approach section of the track leading to the points and when thus energized the relay TER is arranged to open and close intermittently flasher contacts 59, 60 connected in the wires 39, 57 respectively. When the approach section is occupied, therefore, the point indication lamps or their equivalent at the point of control are intermittently operated thus giving an indication that the points are approach locked and that the time controlled relay TER is operating.

It will be observed that when the relay IS is deenergized the energizing circuit of the relay TER includes the contacts of an approach track section relay ATR and a fouling track section relay BTR and contacts MR3 and MR4 of the relay MR which is deenergized by the deenergization of the relay ATR when the approach section is occupied. The relay MR is provided with other relay contacts MR1 and MR2 which are connected in the wires 61, 62, leading from the contacts 40, 45 of the relay IS to the point control relay mechanism.

In order to give a continuous indication at the point of control that the approach section is unoccupied an additional line 63 between the point of control and the remote point is provided. So long as the approach relay ATR is energized, a circuit is completed through front contact of relay ATR, back contact 64 of relay IS, line 63, back contact 65 of relay OS and an indicating device 66 at the point of control.

In order to afford a check on the operation of the relay TER, the latter is provided with a front contact TER2 so that by operating the starting switch to energize the relays OS and IS, a circuit is completed through front contact TER2, front contact 64 of relay IS, line 63, front contact 65 of relay OS and an indication lamp 67.

Alternatively a separate line may be provided for energizing the relay TER, this line serving the dual purpose of energizing the relay and indicating its condition:

In the indication arrangements at the point of control in the systems of the preceding figures, the operation of the starting switch S or of the lever 30 causes the indication lamps to be temporarily unilluminated and this may be prevented if desired by the modified arrangement illustrated in Fig. 5. In this arrangement it will be seen that the indication relays RWKR and NWKR controlling the point indication lamps for instance are each provided with a stick circuit including a relay front contact 68, 69. Assuming that the relay NWKR is energized and that the relay OS is energized by means of the starting switch in order to effect a reversal of the points, the circuit of the relay NWKR including the line 33 is broken at the contact 41 but prior to this interruption a stick circuit for the relay NWKR is completed through contact 68, wire 70, contact 71, and wire 72 so that the relay NWKR is not deenergized during the period when relay OS is energized.

The relay OS in this case is arranged to be of the slow release type so as to maintain the circuit to the relay IS through the line 1 for a sufficient period to enable the relay IS to effect the necessary actions at the remote point.

Referring now to Fig. 6, a modified system is illustrated in which auxiliary starting relays OSB and ISB are provided at the point of control and at the remote point respectively in addition to the main starting relays OSA and ISA.

At the point of control a track indication relay ATK is provided corresponding to a track relay ATR energized when one track section is unoccupied by a train or vehicle, a second track indication relay BTK corresponding to a track relay BTR which is energized when another track section is unoccupied. The relays ATK and BTK are arranged to control the operating circuits of indication lamps 74, 75, and the relays ATK and BTK are arranged to be connected to the remote point by a common line 76.

At the remote point the apparatus comprises relays BK and BV and a valve relay VC. In Fig. 6, the relays controlled by the main starting relays OSA and ISA and adapted to effect the operation of the points or signals are omitted but the arrangement and operation of this part of the apparatus may be similar to those previously described. In operation it will be understood that the energization of the relays OSA and ISA is effected by operating the switch S at the point of control, the relays OSB and ISB remaining normally deenergized. Under these conditions an indication circuit is completed from terminal B through the winding of relay ATK, back contact OSB1 of relay OSB, line 76, back contact ISB1 of relay ISB, wire 77 and a front contact of track relay ATR. So long as the track section corresponding to relay ATR is unoccupied, therefore the relay ATK will remain energized and will complete the circuit of the corresponding indication lamp 75.

When the starting switch S is closed, the main starting relay OSA is energized through a circuit including back contact OSB2 of relay OSB and main starting relay ISA is energized through line 1 and back contact ISB2 of relay ISB. The energization of the relay ISA completes a circuit through the winding of valve relay VC by way of front contact ISA1 of relay ISA so that relay VC is energized and opens its relay contact 78 thus interrupting a circuit including the winding of relay ISB, and preventing this relay from being energized so long as relay ISA is energized.

In the event of a train or vehicle entering the track section corresponding to the relay BTR, assuming the starting switch S to have been released, this relay is deenergized and deenergizes the relay BK by interrupting its circuit at the relay contact BTR. The deenergization of the relay BK completes a circuit through back contact 79 of relay BK, back contact 80 of relay BV, back contact 78 of relay VC, and winding of relay ISB which is thereupon energized. The energization of relay ISB completes a circuit through its front contact ISB2, line 1, and back contact OSA1 of relay OSA to energize relay OSB.

The energization of relay OSB deenergizes the relay ATK at back contact OSB1 and interrupts the stick circuit of relay BTK at contact OSB3 of relay OSB. The deenergization of the relay BTK causes the indication lamp 74 to be extinguished thus providing an indication that the track relay BTR has been deenergized.

It will be observed that the deenergization of the relay BK causes a circuit to be completed through front contact ISB3, wire 81, back contact 82 of relay BK, wire 83 and winding of relay BV which is thus energized and interrupts at its back contact 80 the circuit through winding of relay ISB. The latter is thus deenergized and causes relay OSB to be deenergized, the relay BV remaining however energized through a stick circuit including a back contact 84 of relay BK and a front contact 85 of relay BV.

The stick circuit of the relay BTK being interrupted at the contact 86, the relay BTK still remains deenergized and the lamp 74 consequently remains unilluminated.

As soon as the train or vehicle leaves the section and the relay BTR is consequently reenergized, the relay BK is energized and the relays ISB and OSB are accordingly reenergized so as to restore the relay BTK to its original condition.

The relay BV was held energized when the relay BK was reenergized by means of a stick circuit including the front contact 85 and back contact ISB4 of relay ISB, but as soon as relay ISB which is slightly slow acting has responded, this stick circuit is broken and the relay BV is deenergized thus restoring the system to its original condition.

It will be observed that with this arrangement the line 76 normally serves for the indication of the track section corresponding to the relay ATR but in the event of a train entering the section corresponding to the relay BTR, the line 76 is transferred so as to serve for the indication of this latter section.

5. The valve relay VC is slightly slow acting and serves not only to prevent relay ISB being energized while relay ISA is energized but also serves to cause the relay ISB to be energized each time the relay ISA is deenergized at the end of a control operation. By this arrangement each time the starting switch S is operated the indications controlled by the relays OSA and ISA as well as the indications controlled by the relays ATK and BTK are checked.

The valve relay VC also serves to reestablish the indication circuits including the line 76 after an interruption of current at the point of control or at the remote point since by operating the switch S after such interruption the relay OSB is caused to be operated so as to restore the stick circuit for the relay BTK.

The current employed for operating the systems above described may either be direct or alternating current, the polarization required in certain of the systems being effected by rectifiers or otherwise when alternating current is utilized.

The invention is evidently not limited to the particular arrangements or systems above described and illustrated by way of example which may be varied in many respects without exceeding the scope of the invention.

Having now particularly described and ascertained the nature of my said invention and in what manner the same is to be performed, I declare that what I claim is:

1. In combination with an office and a station at which is located apparatus controlled from said office, a starting circuit connecting said office with said station, a combined control and indication circuit connecting said office with said station, said combined circuit normally serving to provide a continuous indication of the condition of said apparatus at the station, two control relays one at said office and the other at said station for transferring said indication circuit into a control circuit for controlling said apparatus when said relays are energized, said station control relay being connected into said starting circuit, means for energizing said office control relay, and means effective when said office control relay is energized for energizing said starting circuit to thereby energize said station control relay.

2. In combination with an office and a station at which is located apparatus controlled from said office, a starting circuit connecting said office with said station, a combined control and indication circuit connecting said office with said station, a first control relay at said office and a second control relay at said station, said second control relay being included in said starting circuit, a circuit controller at the station controlled by said apparatus in accordance with the condition thereof, means effective when said second control relay is deenergized for connecting said circuit controller with said combined circuit, an indicator at said office, means effective when said first control relay is deenergized for connecting said indicator with said combined circuit to indicate the condition of said apparatus, governing means at the station for operating said apparatus to change the condition thereof, means effective when said second relay is energized for connecting said governing means with said combined circuit, a control lever at said office, means effective when said first relay is energized for connecting said lever with said combined circuit to render said governing means effective to change the condition of said apparatus, means at the office for at times energizing said first control relay, and means effective when said first control relay is energized for energizing said starting circuit to thereby energize said second control relay.

3. In combination with an office and a station at which is located apparatus controlled from said office, a starting circuit connecting said office with said station, a combined control and indication circuit connecting said office with said station and normally serving to provide a continuous indication of the condition of said apparatus at the station, a first control relay at said office and a second control relay at said station, said second control relay being included in said starting circuit, a control lever at said office for controlling said apparatus and having a plurality of operative positions, means at said station effective when both of said relays are energized and said lever occupies one of its operative positions for operating said apparatus in accordance with the position of said lever, means controlled by said lever and effective when the lever is moved from one of its operative positions toward another for energizing said first control relay, and means effective when said first control relay is energized for energizing said starting circuit to thereby energize said second control relay.

4. In combination with an office and a station at which is located apparatus controlled from said office, a starting circuit connecting said office with said station, a combined control and indication circuit connecting said office with said station, said combined circuit normally serving to provide a continuous indication of the condition of said apparatus at the station; two relays, one at said office and the other at said station for transferring said indication circuit into a control circuit for controlling said apparatus, said station relay being controlled by said starting circuit; and means for at times operating said office relay to thereby render said starting circuit effective to control said station relay.

5. In combination with a stretch of railway track, signals for governing traffic thereover in opposing directions over the stretch, a combined signal indication and control conductor extending between the location of said signals and a remote point; means, at such remote point, controlled by said signals over said conductor to continuously indicate the condition of said signals; means partly at such remote point and partly at the signal location for selectively controlling said signals; and means comprising a relay at the signal location, a second relay at the remote point, a second conductor extending between said signal location and the remote point, and a circuit switching device, for temporarily transferring said first conductor into operative relation with said second means for the purpose set forth.

6. In combination with a stretch of railway track, a switch having normal and reverse positions and which routes vehicles or trains to and from said stretch of track when in its reverse position, a combined switch indication and control conductor extending between the switch and a remote point; means, at such remote point, controlled by said switch over said conductor to continuously indicate the position of said switch; means, partly at such remote point and partly at the switch location, for selectively controlling said switch; and means comprising a relay at the switch location, a second relay at the remote point, a second conductor extending between the switch location and the remote point, and a circuit switching device, for temporarily transferring said first conductor into operative relation with said second means.

7. In a remote control system, a controlling station and a field station, apparatus units at said field station having normal and alternate positions or conditions depending on the character of such units, a combined indication and control conductor extending between said field station and said controlling station; means, at such remote point, controlled by said apparatus units over said conductor to continuously indicate the condition or position of said units; means partly at the field station and partly at the controlling station for selectively controlling said units; and means comprising a relay at the field station, a second relay at the controlling station, a conductor extending between said stations, and a circuit switching device, for temporarily transferring said first conductor into operative relation with said second means for the purpose set forth.

8. In a remote control system, a controlling station and a field station, apparatus units at said field station; a combined indication and control conductor, for certain of said units, extending between said stations; a second combined indication and control conductor, for another of said units, extending between said stations; means at the controlling station associated with the respective conductors and controlled by said apparatus units over their respective conductors to continuously indicate the condition of such apparatus units; means partly at the field station and partly at the controlling station for selectively controlling said units; and means comprising a relay at the field station, a second relay at the controlling station, a conductor extending between said stations, and a circuit switching device, for temporarily transferring said first and second conductors into operative relation with said second means for the purposes set forth.

JOHN WOODFORDE.